United States Patent
Huang

(10) Patent No.: US 12,468,085 B2
(45) Date of Patent: Nov. 11, 2025

(54) DISPLAY UNIT AND HOUSEHOLD APPLIANCE HAVING A DISPLAY UNIT

(71) Applicant: BSH Hausgeräte GmbH, Munich (DE)

(72) Inventor: Shanshan Huang, Nanjing (CN)

(73) Assignee: BSH Hausgeräte GmbH, Munich (DE)

( * ) Notice: Subject to any disclaimer, the term of this patent is extended or adjusted under 35 U.S.C. 154(b) by 0 days.

(21) Appl. No.: 18/946,068

(22) Filed: Nov. 13, 2024

(65) Prior Publication Data

US 2025/0216594 A1 Jul. 3, 2025

(30) Foreign Application Priority Data

Dec. 29, 2023 (CN) .......................... 202311863066.9

(51) Int. Cl.
*F21V 8/00* (2006.01)

(52) U.S. Cl.
CPC .................................. *G02B 6/009* (2013.01)

(58) Field of Classification Search
CPC .................................................... G02B 6/009
See application file for complete search history.

(56) References Cited

U.S. PATENT DOCUMENTS

| 11,266,291 | B1 | 3/2022 | Gross et al. |
| 2017/0350603 | A1 | 12/2017 | Je et al. |
| 2018/0340728 | A1* | 11/2018 | Doering ............... G02B 6/0055 |

FOREIGN PATENT DOCUMENTS

| CN | 105698481 B | 10/2018 |
| CN | 115407902 A | 11/2022 |
| EP | 2455930 A1 | 5/2012 |
| EP | 3170044 B1 | 11/2019 |

OTHER PUBLICATIONS

Li et al. (Year: 2017).*
Liu et al. (Year: 2011).*
Zhu et al. (Year: 2017).*
Kibat et al. (Year: 2017).*

* cited by examiner

*Primary Examiner* — Mary Ellen Bowman
(74) *Attorney, Agent, or Firm* — Laurence A. Greenberg; Werner H. Stemer; Ralph E. Locher

(57) ABSTRACT

A display unit includes a display panel, a printed circuit board having at least one first light-emitting element configured to illuminate the display panel, and a light guide member having a light incident surface facing the first light-emitting element and a light outgoing surface facing a rear side of the display panel. The light outgoing surface is closer to an edge of the display panel than the light incident surface in a direction parallel to the printed circuit board. A household appliance having the display unit is also provided.

13 Claims, 6 Drawing Sheets

DISPLAY UNIT AND HOUSEHOLD APPLIANCE HAVING A DISPLAY UNIT

CROSS-REFERENCE TO RELATED APPLICATION

This application claims the priority, under 35 U.S.C. § 119, of Chinese Patent Application CN 202311863066.9, filed Dec. 29, 2023; the prior application is herewith incorporated by reference in its entirety.

FIELD AND BACKGROUND OF THE INVENTION

Embodiments of the present invention relate to a display unit and a household appliance having the display unit.

A household appliance usually has a display unit for a user to obtain information about the household appliance and/or to receive an input instruction of the user for the household appliance. The display unit usually has a backlight to illuminate a display panel. A range of an area on the display panel that can be illuminated is limited by an arrangement range of a backlight apparatus.

SUMMARY OF THE INVENTION

It is accordingly an object of the invention to provide an improved display unit configured for a household appliance and a household appliance having such a display unit, which overcome the hereinafore-mentioned disadvantages of the heretofore-known devices of this general type.

With the foregoing and other objects in view there is provided, in accordance with an aspect of the embodiments of the present invention, a display unit configured for a household appliance. The display unit includes: a display panel; a printed circuit board, including at least one first light-emitting element configured to illuminate the display panel; and a light guide member, including a light incident surface facing the first light-emitting element and a light outgoing surface facing a rear surface of the display panel, where the light outgoing surface is closer to an edge of the display panel than the light incident surface in a direction parallel to the printed circuit board.

In a possible embodiment, the display panel includes an illuminated area capable of being illuminated by a light outgoing portion, and the illuminated area includes an outline of the display panel at the edge.

In a possible embodiment, the display panel includes an end surface connecting a front surface and a rear surface of the display panel, and in a direction perpendicular to the display panel, a projection of the end surface is located on the light outgoing surface.

In a possible embodiment, the light guide member includes a peripheral surface connected to the light outgoing surface, and the peripheral surface is flush with the end surface.

In a possible embodiment, the display unit includes a peripheral wall located between the printed circuit board and the display panel in a direction perpendicular to the display panel, the peripheral wall has a window, and the light guide member is located in the window.

In a possible embodiment, in the direction perpendicular to the display panel, the light outgoing surface overlaps with the window; and/or
 in the direction perpendicular to the display panel, an illuminated area of the display panel illuminated by the light outgoing surface overlaps with the window; and/or the window is closed by the light guide member; and/or a part of the light guide member exposed outside the display unit is flush with the peripheral wall.

In a possible embodiment, the display unit includes a chamber located behind the display panel and configured to accommodate at least a part of the printed circuit board, where the first light-emitting element is located in the chamber, and the light guide member extends from inside the chamber to outside the chamber, to illuminate the rear side of the display panel.

In a possible embodiment, the display unit includes a bracket located behind the display panel, where
 the bracket includes at least a part of a peripheral wall defining the display unit, and the peripheral wall has a window configured to accommodate the light guide member; and/or
 the bracket includes a receiving slot configured to receive the light guide member, and the receiving slot is open on a front side facing the display panel and on a peripheral side; and/or
 the light guide member is clamped in the bracket; and/or
 the bracket has an elastic arm, and the light guide member has a hook portion matching the elastic arm.

In a possible embodiment,
 the printed circuit board includes at least one second light-emitting element, the bracket has a light transmission slot running through the bracket, and light of the at least one second light-emitting element is configured to emit to the display panel through the light transmission slot; and/or
 the printed circuit board is supported on a back side of the bracket, the display panel is located on a front side of the bracket, and the first light-emitting element emits light suitable to pass through the bracket to illuminate the display panel; and/or
 the receiving slot extends obliquely; and/or
 the receiving slot extends over an entire width of the bracket; and/or
 the light guide member extends over the entire width of the bracket.

In a possible embodiment,
 the light guide member is exposed outside the display unit; and/or
 at least a part of a section of the light guide member between the light incident surface and the light outgoing surface extends obliquely, enabling a transmission path of light in the light guide member has a distance in a direction parallel to the display panel.

In a possible embodiment, the light guide member includes a part exposed outside the display unit and located between the light outgoing surface and the light incident surface; and/or two ends of the light guide member are exposed on two sides of the display unit.

In a possible embodiment,
 the light guide member includes a plurality of light incident portions spaced apart, and each light incident portion has a light incident surface corresponding to one or a group of first light-emitting elements; and/or
 the light guide member includes a light outgoing portion, and the light outgoing surface continuously extends at a front end of the light outgoing portion.

With the objects of the invention in view, there is concomitantly provided another aspect of the embodiments of the present invention which relates to a household appliance. The household appliance includes the display unit according to any one of the embodiments described above.

In a possible embodiment, the household appliance includes an allocation cavity, in which the display unit is distributed along a side of the allocation cavity, and the light guide member is exposed to the allocation cavity.

Other features which are considered as characteristic for the invention are set forth in the appended claims.

Although the invention is illustrated and described herein as embodied in a display unit and a household appliance having a display unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
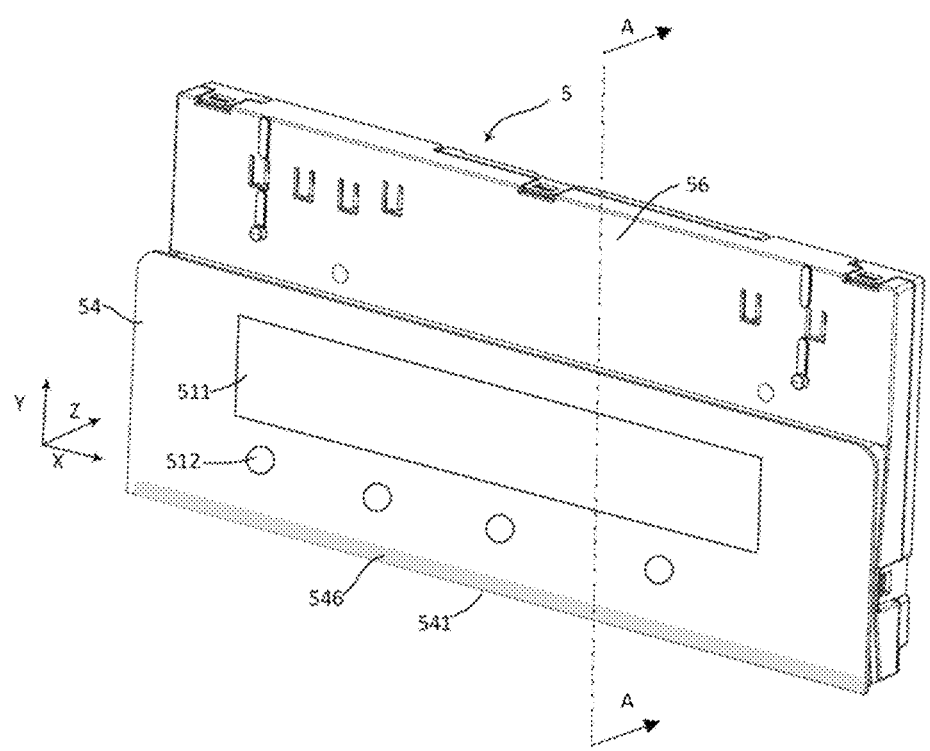
FIG. 1 is a diagrammatic, perspective view of a display unit according to an embodiment of the present invention.

Referring now to the figures of the drawings in detail and first, particularly, to FIGS. 1-7 thereof, there is seen a display unit 5 which includes a display panel 54 and a printed circuit board 53 located on a back side of the display panel 54. In the descriptions used in this application, a side of the display panel 54 facing away from the printed circuit board 53 is a front side. Generally, after the display panel 54 is mounted on a household appliance, the front side of the display panel 54 can be touched and/or seen by a user. A side of the display panel 54 facing the printed circuit board 53 is a rear side or a back side.

In an embodiment, the display panel 54 may include a transparent substrate and a lightproof layer attached to the transparent substrate. A light source of the printed circuit board 53 illuminates a corresponding area of the display panel 54 to display information to the user.

The printed circuit board 53 has at least one first light-emitting element 531 configured to illuminate the display panel 54 from the back side of the display panel 54.

In an exemplary embodiment, the printed circuit board 53 has a plurality of first light-emitting elements 531, and the plurality of first light-emitting elements 531 are spaced in a row.

The display unit 5 may include a touch film 55 disposed along a rear surface 548 of the display panel 54.

The touch film 55 may be sandwiched between the display panel 54 and a bracket 56. The display panel 54 may be fixed on a front side of the bracket 56 through a bonding apparatus.

When the user touches a corresponding area of the display panel 54 (for example, an operation portion 512 diagrammatically shown in FIG. 1), a sensing portion 551 corresponding to the touch film 55 may transmit a sensing signal to the printed circuit board 53.

In an embodiment, the printed circuit board 53 is located on a rear side of the bracket 56 facing away from the display panel 54. The touch film 55 is connected to the printed circuit board 53 through a connecting portion 552 spanning the bracket 56.

The printed circuit board 53 includes a plurality of second light-emitting elements 532. The second light-emitting element 532 is configured to illuminate a display portion 511 and the operation portion 512 of the display unit 5. The bracket 56 has a plurality of spaced light transmission slots 561, and light of the second light-emitting element 532 may illuminate a corresponding area of the display panel 54 through a corresponding light transmission slot 561. The display portion and the operation portion may be disposed at different positions, or may be disposed at the same position.

The display unit 5 may include a rear cover 58, and the printed circuit board 53 is located between the bracket 56 and the rear cover 58.

The display unit 5 includes a light guide member 57 configured to guide light of the first light-emitting element 531 to a specific area of the display panel 54.

In an exemplary embodiment, the light guide member 57 is configured to guide the light emitted by the first light-emitting element 531 to an edge area of the display panel 54. In this way, a corresponding illuminated area of the display panel 54 may be closer to an outline 541 that can be seen by the user from the front side of the display panel 54 than the first light-emitting element 531, or even cover the outline 541.

The outline 541 may be formed by an intersection of a front surface 545 and an end surface 547 of the display panel 54, where the end surface 547 connects the front surface 545 and the rear surface 548. In an exemplary embodiment, the outline 541 may be an intersection edge between the front surface 545 and the end surface 547.

Through illumination, the light illuminates an outermost edge area of the display panel 54, so that the user can obtain, from the front side of the display panel 54, an illuminated area 546 without a spacing from an outer contour of the display panel 54. In this way, integration between the display panel 54 and a periphery is enhanced.

In a variant embodiment, a slight spacing (for example, not greater than 1 millimeter) is maintained between the illuminated area 546 and the outline 541, and the spacing between the illuminated area 546 and the outline 541 is not visible to the naked eye. The user sees that the illuminated area 546 extends inward by a predetermined distance from an outermost edge of the display panel 54.

In an exemplary embodiment, the light guide member 57 includes a light incident surface 571 facing the first light-emitting element 531 and a light outgoing surface 572 facing the rear surface 548 of the display panel 54. In a direction parallel to the display panel 54, the light outgoing surface 572 is closer to an edge of the display panel 54 than the light incident surface 571, and closer to the outline 541 of the display panel 54 in particular.

The light guide member 57 may be disposed so that light entering from the light incident surface 571 exits only from the light outgoing surface 572.

The light outgoing surface 572 may be in a shape adapted to a shape of the display panel 54. For example, the light outgoing surface 572 is a flat surface.

In an exemplary embodiment, the outline 541 extends in a transverse direction X of the display panel 54. Therefore, a spacing exists between the light outgoing surface 572 and the first light-emitting element 531, and between the light incident surface 571 and the first light-emitting element 531 in a height direction Y of the display panel 54. It should be understood that, if the outline extends in the height direction of the display panel, a spacing may exist between the light outgoing surface 572 and the first light-emitting element 531, and between the light incident surface 571 and the first light-emitting element 531 in the transverse direction X of the display panel 54.

FIG. 1 diagrammatically shows the illuminated area 546 of the display panel 54 illuminated by the light transmitted from the light guide member 57. In this embodiment, the illuminated area 546 covers the outline 541 extending along a lower edge of the display panel 54.

Figure 2:
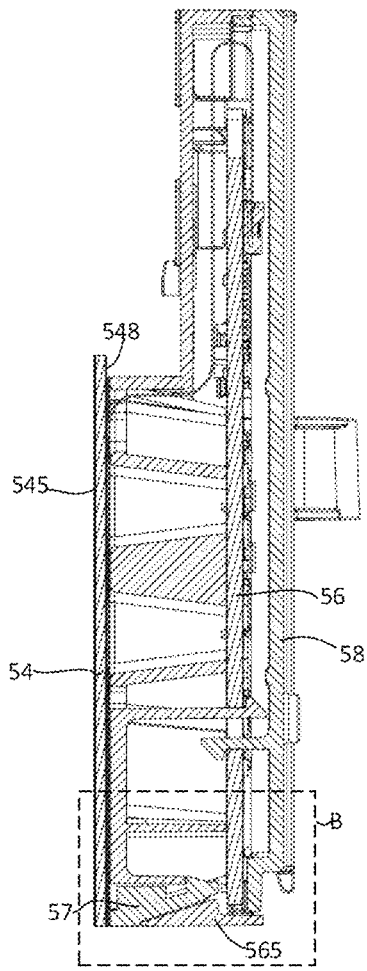
FIG. 2 is a diagrammatic, cross-sectional view of a display unit taken along a line A-A in FIG. 1 according to an embodiment of the present invention.
Figure 3:
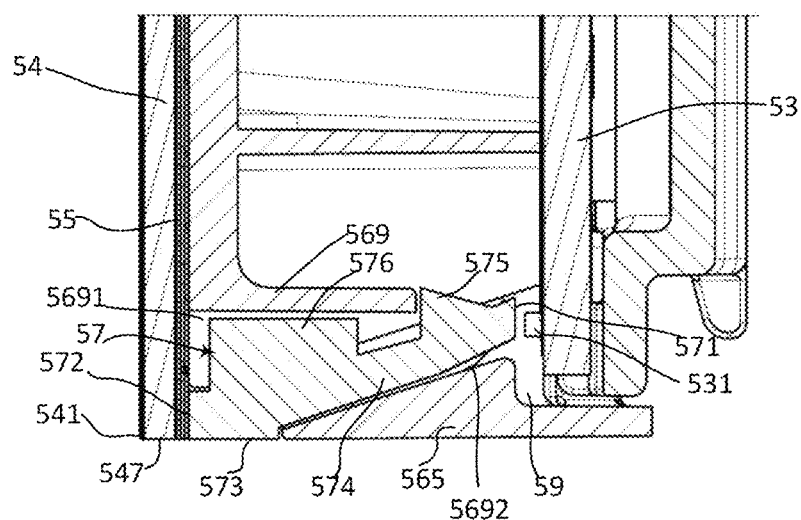
FIG. 3 is a partially enlarged view of a part B in FIG. 2.
Figure 4:
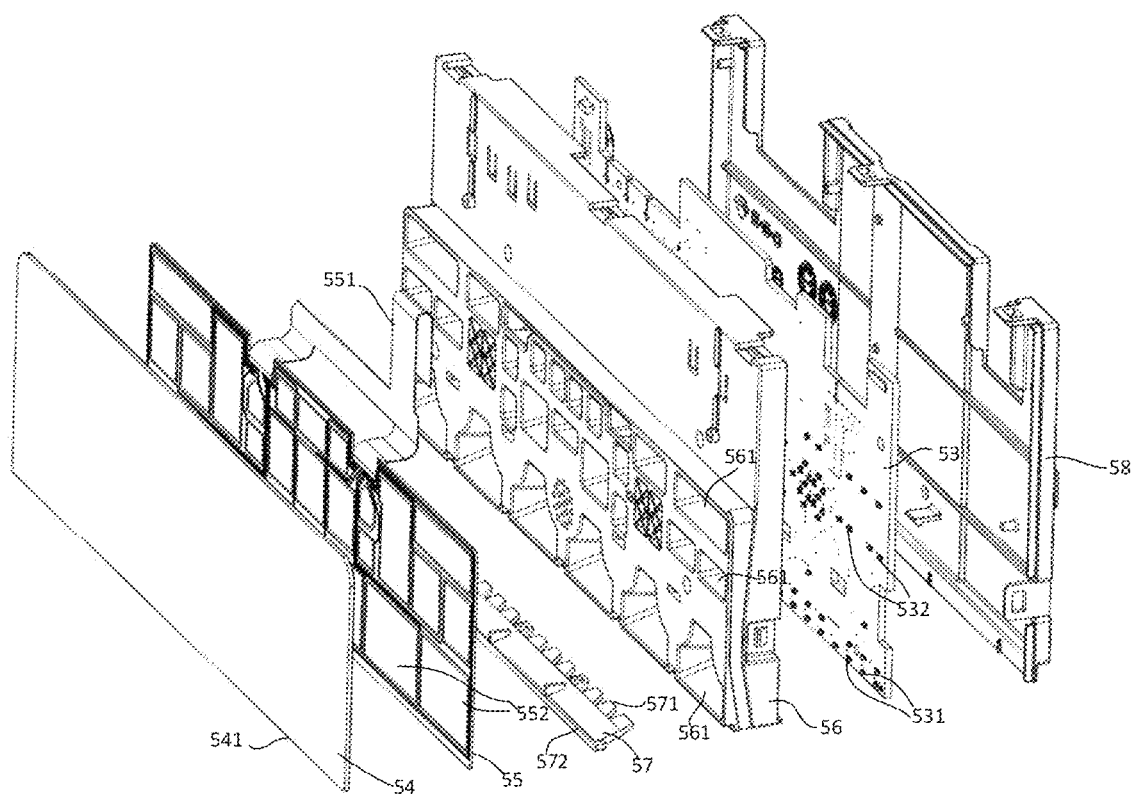
FIG. 4 is a diagrammatic, exploded, perspective view of a display unit according to an embodiment of the present invention.
Figure 5:
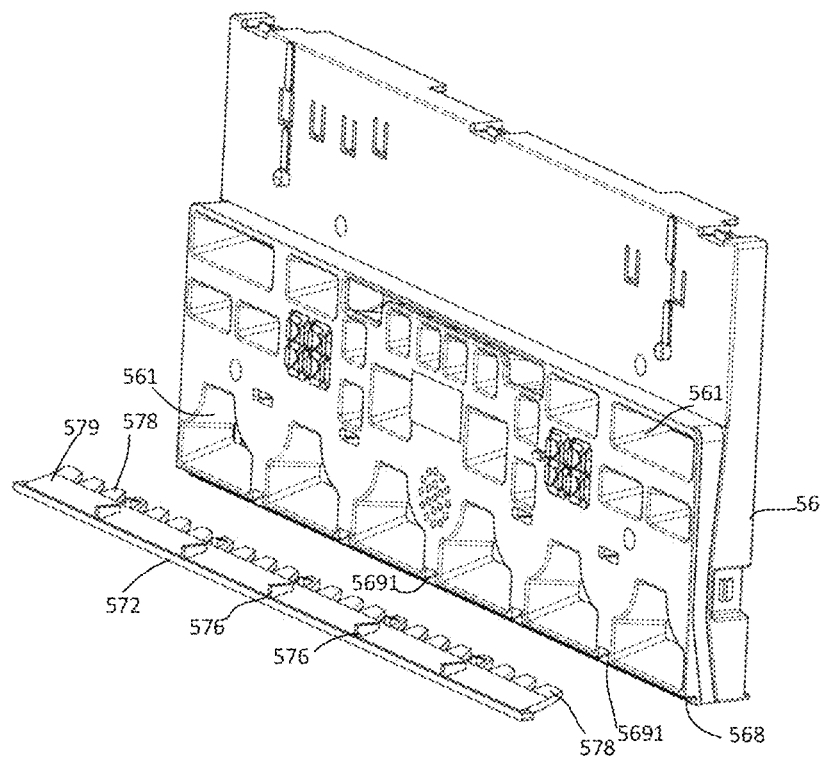
FIG. 5 is a diagrammatic, perspective view as seen when a bracket and a light guide member are separated according to an embodiment of the present invention.

As shown in FIG. 2 and FIG. 3, the display panel 54 includes the end surface 547 connected to the front surface 545 and the rear surface 548 of the display panel 54. In a direction Z perpendicular to the display panel 54, a projection of the end surface 547 is located within the light outgoing surface 572.

The light guide member 57 includes a peripheral surface 573 connected to the light outgoing surface 572, and the peripheral surface 573 is flush with the end surface 547. The peripheral surface 573 is close to the light outgoing surface 572 and may be perpendicularly connected to the light outgoing surface 572.

The light guide member 57 may be exposed to an outer side of the display unit 5. A part of the light guide member 57 located outside the display unit 5 may form a part of an outer surface of the display unit 5.

The part of the light guide member 57 exposed outside the display unit 5 is located between the light outgoing surface 572 and the light incident surface 571. The light guide member 57 may be disposed so that light is not transmitted out from the part exposed to the outer side of the display unit 5. As shown in FIG. 2 and FIG. 3, the peripheral surface 573 is exposed to the outer side of the display unit 5, to be touchable from the outer side of the display unit 5. On an outer peripheral surface of the display unit 5, the end surface 547 and the light guide member 57 may be flush.

The light guide member 573 includes an inclined light guide portion 574 located between the light incident surface 571 and the light outgoing surface 572, so that a transmission path of light in the light guide member has a distance in the direction parallel to the display panel 54. In this way, the light emitted by the first light-emitting element 531 can illuminate the edge area of the display panel 54.

The display unit 5 includes a peripheral wall 565 located between the printed circuit board 53 and the display panel 54 in the direction perpendicular to the display panel 54. The peripheral wall 565 has a window 566, and the light guide member 57 is located in the window 566. Therefore, the light guide member 57 is exposed outside the display unit 5.

The window 566 may be closed by the light guide member 57, as shown in FIG. 3. In the direction perpendicular to the display panel 54, the light outgoing surface 572 overlaps with the window 566. Therefore, the illuminated area 546 illuminated by the light outgoing surface 572 overlaps with the window 566. The peripheral surface 573 located in the window 566 and exposed outside the display unit 5 may be a flat surface. Therefore, after the window 566 is closed, it is possible that the peripheral surface 573 and the peripheral wall 565 may be substantially located in the same plane and be substantially flush.

The display unit 5 may include a chamber 59 located behind the display panel 54 and configured to accommodate at least a part of the printed circuit board 53. The first light-emitting element 531 is located in the chamber 59. The light guide member 57 extends from inside the chamber 59 to outside the chamber 59. The peripheral wall 565 defines a part of a boundary of the chamber 59.

In the direction perpendicular to the display panel 54, the illuminated area 546 of the display panel 54 illuminated by the light guide member 57 and the light outgoing surface 572 overlaps with the peripheral wall 565 defining the chamber 59. In this way, a technical problem in the related art that the illuminated area of the display panel 54 cannot exceed an outer surface of the peripheral wall 565, can be resolved.

The printed circuit board 53 may be supported on the bracket 56. The peripheral wall 565 is located in the bracket 56, so that the bracket 56 forms a part of the outer peripheral surface of the display unit 54.

The bracket 56 includes a receiving slot 567 configured to receive the light guide member 57. The receiving slot 567 provides communication between the chamber 59 and a front side and a peripheral side of the bracket 56. In this way, the receiving slot 567 is open on a front side facing the display panel 54 and on a peripheral side. In an embodiment, the receiving slot 567 is open downward.

A front end of the light guide member 57 extends out of the receiving slot 567, and is located in a space 568 formed between the display panel 54 and the bracket 56. The light outgoing surface 572 is located in the space 568 and faces the rear surface 548 of the display panel 54. The peripheral surface 573 is exposed outside of the display unit 5 at the space 568.

In an exemplary embodiment, the light guide member 57 extends along an entire width of the display unit 5, so that the receiving slot 567 also extends along the entire width of the display unit 5. Two ends of the light guide member 57 may be exposed on two sides of the display unit 5 in a transverse direction.

Figure 6:
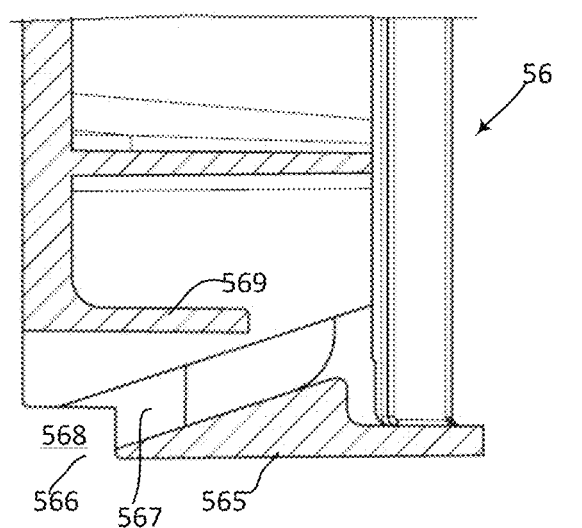
FIG. 6 is a diagrammatic, partial cross-sectional view of a bracket according to an embodiment of the present invention.
Figure 7:
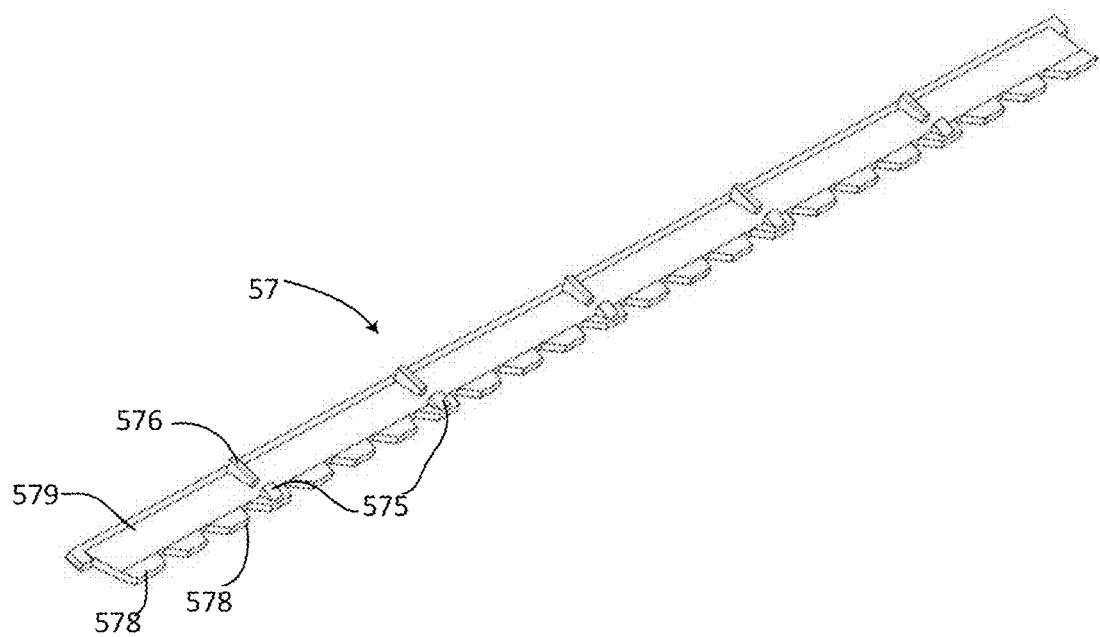
FIG. 7 is a diagrammatic, perspective view of a light guide member according to an embodiment of the present invention.

The light guide member 57 is adapted to be inserted into the receiving slot 567 from the front side of the bracket 56. As shown in FIG. 2, FIG. 3, and FIG. 6, the light guide member 57 is clamped on the bracket 56. The light guide member 57 includes a plurality of hook portions 575 protruding upward. After the light guide member 57 is inserted into the receiving slot 567 from the front side of the bracket 56, the hook portions 575 are hooked with a free end of an elastic arm 569 of the bracket 57, thereby preventing the light guide member 57 from exiting the receiving slot 567.

A rear end of the elastic arm 569 is the free end. In a process in which the light guide member 57 is inserted into the receiving slot 567, the elastic arm 569 deforms upward under an action of a top end of the hook portion 575, to allow the hook portion 575 to enter the light guide member 57 to move to the light incident surface 571, to become close to the first light-emitting element 531. At a mounted position, due to matching between the hook portion 575 and the elastic arm 569, movement of the light guide member 57 in a front-rear direction is limited.

A guide structure configured to locate the light guide member 57 and guide insertion of the light guide member 57 into the receiving slot 567 is disposed between the bracket 56 and the light guide member 57. The guide structure may include a plurality of guide blocks 576 protruding upward from the light guide member 57, and the light guide member 57 has a guide groove 5691 adapted to receive the guide block 576.

The bracket 56 includes an inclined wall 5692 defining a part of a boundary of the receiving slot 567. In an exemplary embodiment, the inclined wall 5692 defines at least a part of a lower groove surface of the receiving slot 567. The inclined wall 5692 is inclined upward in a front-to-rear direction. The light guide member 57 has an inclined surface corresponding to the inclined wall 5692.

In a process of assembling the light guide member 57 onto the bracket 56, the guide block 576 is aligned with a corresponding guide groove 5691 to be limited in a left-right direction, and through guidance of the inclined wall 5692, a rear end of the light guide member 57 moves upward, and finally the light incident surface 571 located at the rear end of the light guide member 57 is aligned with a corresponding first light-emitting element 531.

In an exemplary embodiment, the plurality of first light-emitting elements 531 are disposed in a row on an edge of the printed circuit board 53. The light guide member 57 has a plurality of light incident portions 578 spaced apart at a rear portion. Each light incident portion 578 is aligned with one or a group of corresponding first light-emitting elements 531, so that light of the corresponding first light-emitting elements 531 enters the light guide member 57 from a light incident surface 571 of the corresponding light incident portion 578.

In an exemplary embodiment, the light guide member 57 includes a light outgoing portion 579 connected to front sides of the plurality of light incident portions 578, and the light outgoing surface 572 is located at front ends of the light outgoing portion 579. The light outgoing portion 579 is continuously disposed, so that the light outgoing surface 572 is continuous.

In this way, while a continuous illuminated area 546 can be obtained on the display panel 54, the first light-emitting element 531 is independently controlled, so that the illuminated area 546 may be controlled partially.

In an exemplary embodiment, the illuminated area 546 may be in a strip shape extending along the edge of the display panel 54. The first light-emitting element 531 may be used as ambient lighting and/or for an indication function.

In an exemplary embodiment, there is no gap between the illuminated area 546 and the outline 541. In other words, the display panel 54 is illuminated from the outline 541 visible at the front end, and the illuminated area 546 extends a preset distance to the other side of the display unit 5.

It should be understood that, in an alternative embodiment, when the light guide member 57 transmits the light of the first light-emitting element 531 toward the outline 541 by the preset distance to reduce a distance between the illuminated area and the outline 541, a gap may exist between the illuminated area 546 and the outline 541. In this way, a relationship between the illuminated area and the outline 541 may be disposed according to design requirements.

Figure 8:
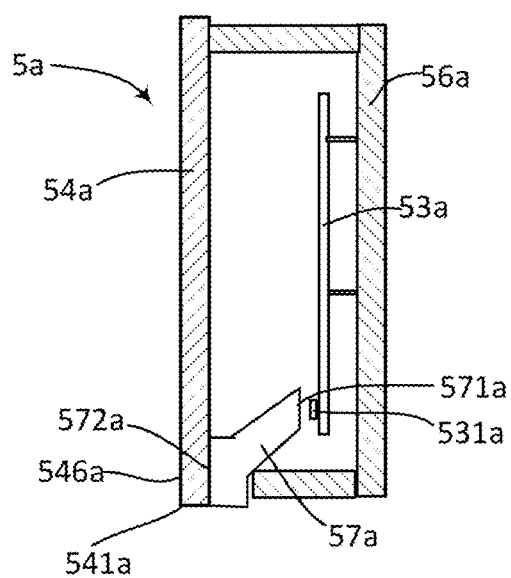
FIG. 8 is a diagrammatic, cross-sectional view of a display unit according to another embodiment of the present invention.

FIG. 8 is a diagrammatic, cross-sectional view of a display unit according to another embodiment of the present invention. As shown in FIG. 8, a printed circuit board 53a is located between a display panel 54a and a bracket 56a. A light guide member 57a guides light of a first light-emitting element 531a located on the printed circuit board 53a to an edge area of the display panel 54a. A light incident surface 571a and a light outgoing surface 572a of the light guide member 57a are at a distance in a height direction of the display unit 5a, so that an illuminated area 546a of the display panel 54a illuminated by the first light-emitting element 531a is closer to an edge of the display panel 5a than the first light-emitting element 531a.

In this embodiment, the illuminated area 546a illuminated by the light guide member of the display panel 5a and the light outgoing surface 572a extend outside the outer surface of the peripheral wall 565 defining the display unit 5a in a direction parallel to the display panel 5a. This is particularly conducive when an end surface of the display panel 5a needs to exceed the peripheral wall 565.

Figure 9:
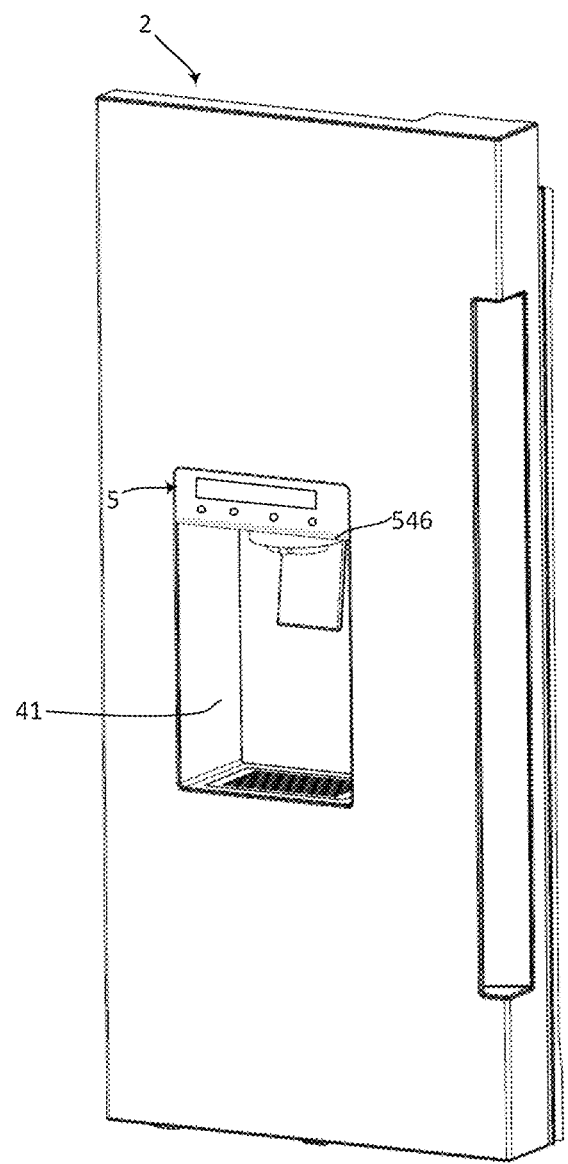
FIG. 9 is a diagrammatic, perspective view of a door of a refrigeration appliance having a display unit according to an embodiment of the present invention.

FIG. 9 shows a door 2 of a refrigeration appliance having the display unit 5 according to an embodiment of the present invention. The door 2 is configured to close a storage compartment (not shown) of the refrigeration appliance (not shown). The door 2 includes an allocation cavity 41 recessed backward from a front side of the door 2 and the display unit 5 disposed along a side of the allocation cavity 41. An edge of the display unit 5 close to the allocation cavity 41 may be illuminated, and an illuminated area 546 of the display unit 5 covers an outline 541 of the display panel 54 close to the allocation cavity 41.

In this way, from a front side of the refrigeration appliance, the illuminated area 546 and the allocation cavity 41 are seamlessly connected. This can significantly enhance integration between the display unit 5 and the allocation cavity 41. The foregoing technical advantages of the display unit based on the embodiments of the present invention can be obtained without significantly complicating an overall layout of the display unit 5.

A peripheral surface 574 of the light guide member 5 is exposed in the allocation cavity 41 due to being exposed on a lower side of the display unit 5.

It may be understood that the display units 5 and 5a may alternatively be disposed at another position of the refrigeration appliance. The display units 5 and 5a are applied to other household appliances, for example, different household appliances such as a laundry washing and/or drying machine, a dishwasher, a cooker hood, and an oven.

Various embodiments of single components described with reference to FIG. 1 to FIG. 9 may be combined with each other in any given manner, to achieve the advantages of the present invention. In addition, the present invention is not limited to the illustrated embodiments, and generally, other measures than the illustrated measures may also be used, provided that the measures can also achieve the same effect.

The invention claimed is:

1. A display unit configured for a household appliance, the display unit comprising:
   a display panel having a rear side and an edge;
   a printed circuit board including at least one first light-emitting element configured to illuminate said display panel;
   a light guide member including a light incident surface facing said at least one first light-emitting element and a light outgoing surface facing said rear side of said display panel;

said light outgoing surface being closer to said edge of said display panel than said light incident surface in a direction parallel to said printed circuit board; and a peripheral wall disposed between said printed circuit board and said display panel in a direction perpendicular to said display panel, said peripheral wall having a window, and said light guide member being disposed in said window.

2. The display unit according to claim 1, wherein said display panel includes an illuminated area configured to be illuminated by said light outgoing surface, said illuminated area including an outline of said display panel at said edge.

3. The display unit according to claim 1, wherein said display panel has a front surface and a rear surface, said display panel includes an end surface interconnecting said front surface and said rear surface of said display panel, and said end surface has a projection located on said light outgoing surface, in a direction perpendicular to said display panel.

4. The display unit according to claim 3, wherein said light guide member includes a peripheral surface connected to said light outgoing surface, and said peripheral surface is flush with said end surface.

5. The display unit according to claim 1, wherein at least one of:
said light outgoing surface overlaps said window in the direction perpendicular to said display panel, or
said display panel has an illuminated area illuminated by said light outgoing surface, said illuminated area overlapping said window in the direction perpendicular to said display panel, or
said window is closed by said light guide member, or
a part of said light guide member exposed outside the display unit is flush with said peripheral wall.

6. The display unit according to claim 1, which further comprises a chamber located behind said display panel and configured to accommodate at least a part of said printed circuit board, said at least one first light-emitting element being located in said chamber, and said light guide member extending from inside said chamber to outside said chamber, to illuminate said rear side of said display panel.

7. A display unit configured for a household appliance, the display unit comprising:
a display panel having a rear side and an edge;
a printed circuit board including at least one first light-emitting element configured to illuminate said display panel;
a light guide member including a light incident surface facing said at least one first light-emitting element and a light outgoing surface facing said rear side of said display panel;
said light outgoing surface being closer to said edge of said display panel than said light incident surface in a direction parallel to said printed circuit board;
a bracket located behind said display panel, and at least one of:
said bracket includes at least a part of a peripheral wall defining the display unit, said peripheral wall having a window configured to accommodate said light guide member, or
said bracket includes a receiving slot configured to receive said light guide member, said receiving slot being open on a front side facing said display panel and on a peripheral side, or
said bracket accommodates said light guide member clamped in said bracket, or said bracket has an elastic arm, and said light guide member has a hook portion matching said elastic arm.

8. The display unit according to claim 7, wherein at least one of:
said printed circuit board includes at least one second light-emitting element, said bracket has a light transmission slot running through said bracket, and said at least one second light-emitting element is configured to emit light to said display panel through said light transmission slot, or
said printed circuit board is supported on a back side of said bracket, said display panel is located on a front side of said bracket, and said at least one first light-emitting element emits light suitable to pass through said bracket to illuminate said display panel, or
said receiving slot extends obliquely, or
said receiving slot extends over an entire width of said bracket, or
said light guide member extends over an entire width of said bracket.

9. A display unit configured for a household appliance, the display unit comprising:
a display panel having a rear side and an edge;
a printed circuit board including at least one first light-emitting element configured to illuminate said display panel;
a light guide member including a light incident surface facing said at least one first light-emitting element and a light outgoing surface facing said rear side of said display panel;
said light outgoing surface being closer to said edge of said display panel than said light incident surface in a direction parallel to said printed circuit board; and
wherein at least one of:
said light guide member is exposed outside the display unit, or
at least a part of a section of said light guide member between said light incident surface and said light outgoing surface extends obliquely, enabling a transmission path of light in said light guide member to be at a distance in a direction parallel to said display panel.

10. The display unit according to claim 9, wherein at least one of:
said light guide member includes a part exposed outside the display unit and located between said light outgoing surface and said light incident surface, or
said light guide member has two ends exposed on two sides of the display unit.

11. The display unit according to claim 1, wherein at least one of:
said light guide member includes a plurality of spaced-apart light incident portions, and each of said light incident portions has a light incident surface corresponding to said at least one first light-emitting element or a group of first light-emitting elements, or
said light guide member includes a light outgoing portion, and said light outgoing surface continuously extends at a front end of said light outgoing portion.

12. A household appliance, comprising the display unit according to claim 1.

13. The household appliance according to claim 12, which further comprises an allocation cavity, the display unit being distributed along a side of the allocation cavity, and said light guide member being exposed to said allocation cavity.

* * * * *